Aug. 20, 1929.  E. C. BALLMAN  1,725,558

SINGLE PHASE MOTOR

Filed Nov. 3, 1927

Inventor:
EDWIN C. BALLMAN,
By John N. Bruninga
His Attorney.

Patented Aug. 20, 1929.

1,725,558

UNITED STATES PATENT OFFICE.

EDWIN C. BALLMAN, OF ST. LOUIS, MISSOURI.

SINGLE-PHASE MOTOR.

Application filed November 3, 1927. Serial No. 230,715.

This invention pertains to electric motors and particularly to alternating current motors of the single phase type.

In that type of single phase motor known as the condenser type, an auxiliary stator winding is supplied with a current whose phase has been changed with respect to that of the main stator winding by the insertion of a condenser in the auxiliary circuit. This has the effect of making the current in that circuit leading with respect to the current in the main winding. In this way a difference of phase between the two stator currents is obtained, which has the effect of producing in the magnetic core a rotating field approaching somewhat in its nature the field of a polyphase motor.

In the design of such motors, it is a difficult matter to obtain a desired phase relation without providing a condenser of such capacity as to be somewhat cumbersome as an auxiliary piece of apparatus. Furthermore, as the speed of the motor changes, the current in the auxiliary winding is liable to change in an undesirable manner so as to produce undesirable characteristics when the motor is running at full speed.

One of the objects of this invention, therefore, is to provide an alternating current motor of the condenser type, in which an auxiliary winding of simplified form and construction is used, and in which provision is made for the control or adjustment of the current in that winding at different speeds.

Another object is to provide such a motor with a special rotor winding which will improve the characteristics of the motor at both starting and full running speeds.

Another object is to provide a motor which will operate satisfactorily as a variable speed motor and with simple devices for controlling the speed.

Another object is to provide such a single phase motor with improved characteristics which may be used either as a double voltage motor—that is, for operation at either of two standard voltages—or as a 2-speed motor without the use of external controlling means.

Further objects will appear from the following description, taken in connection with the accompanying drawing, in which—

Figure 1:
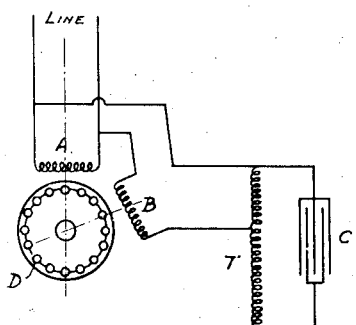
Figure 1 is a diagrammatic view representing the windings and connection of a motor embodying this invention.

Referring to the drawing, and more particularly to Figure 1, A represents the main stator winding of a single phase induction motor, having the usual squirrel cage rotor D. An auxiliary stator winding B is wound on the same core as A, displaced angularly therefrom by substantially 60 electrical degrees. The winding B is so placed with respect to the winding A, being substantially 60 electrical degrees therefrom, as to have induced therein an electro-motive force or voltage by the magnetic flux set up by the winding A. This voltage is induced in the winding B by transformer action of a component of the flux set up by the winding A.

The winding B will, therefore, have induced therein an electro-motive force or voltage whose magnitude will depend on the ratio of the number of turns of the windings B and A, and also upon the angular displacement of B from A. The winding B is connected in series with the supply line so that its voltage will be combined with that of the supply, and the resultant voltage is impressed upon a transformer T. The transformer T may be either of the auto or two-coil type. The transformer T steps up this resultant voltage to such a value as may be conveniently impressed upon a condenser C connected to the transformer, as illustrated in Figure 1. It will be seen by means of the transformer T, that any desired condenser voltage may be obtained so that the condenser C may be designed so as to have a minimum bulk consistent with the required capacity. By raising the condenser voltage, the current capacity required will be reduced and consequently the size of the condenser will be accordingly reduced.

In the operation of this motor, the magnetic flux set up by the winding A induces in the winding B a certain voltage which is combined with the supply voltage and the resultant thereof impressed upon the transformer T. The transformer T steps the voltage to such a value as to impress a certain current flow upon the condenser C. The flow of the current in the condenser C controls, through the action of the transformer T, the flow of current in the winding B. As the current in the condenser C is a leading current, a similar leading current will flow in the winding B. The flux set up in the magnetic circuit by the current in B will, therefore, be leading in phase with respect to the flux set up by the main winding A, and the combination of these two fluxes will produce a rotating field. Such a rotating field, acting upon the rotor D, will produce a torque therein.

The above described conditions obtain at starting; accordingly, the motor exerts a starting torque which causes the armature to rotate. As the rotor increases in speed, an electro-motive force of rotation is generated in the winding B in a well known manner, and this is added to the voltage induced in that winding by transformer action from the winding A. Accordingly, the total voltage of the winding B will increase as the speed of the motor increases, and the voltage impressed on the transformer T will increase accordingly. This has the effect of increasing the current flowing in the condenser C and thereby increasing correspondingly the current flowing in the winding B. This is a leading current, and as it increases in value with increase of speed, the current in B will lead by a greater amount at full speed than at starting, and, consequently, the power factor of the motor at full speed will be reduced accordingly.

Figure 2:
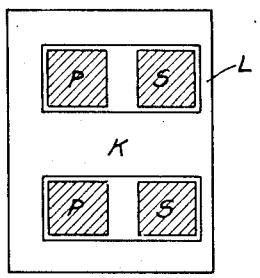
Figure 2 is a diagrammatic cross-sectional view of a transformer used in the regulation of the above motor.

In order to overcome this difficulty, the design of the transformer T is so arranged as to control or adjust the current in the condenser C and the winding B in accordance with the change in motor speed. The method of accompilshing this is illustrated in Figure 2, in which K represents the transformer core, constructed in the usual manner, except that one part L of the magnetic circuit is constructed of smaller cross-section than other parts of the magnetic circuit. The primary winding P and the secondary winding S are wound upon this core in such a manner that the flux which links with both coils must traverse the reduced portion L of the magnetic circuit. With such a transformer, the voltage impressed upon it at starting will be relatively low so that the magnetic flux will be relatively low and the part L of the magnetic circuit will be unsaturated. As the voltage impressed upon the transformer increases with increase in motor speed, the winding P will generate a correspondingly greater flux. The design is such that at a certain voltage, the portion L of the magnetic circuit becomes saturated so that a portion of the flux produced by the winding P will be forced out of the core to traverse leakage paths which do not link with the winding S. This leakage of flux changes the transformation ratio more and more as the voltage impressed upon P increases so that, after saturation occurs in the portion L of the core, the voltage induced in the secondary winding S will remain nearly constant. This voltage impressed upon the condenser C will cause a corresponding current to flow therein, and, as pointed out above, this current will control the current flowing in the winding B of the motor.

It will be seen, therefore, that by providing leakage in the transformer T, the current in the condenser circuit, and therefore also in the circuit of the winding B, may be controlled or adjusted to such a value as to give practically unity power factor to the motor as a whole at full speed.

Figure 3:
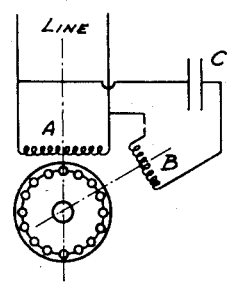
Figures 3 and 4 are diagrams similar to Figure 1, showing another embodiment of this invention.
Figure 4:
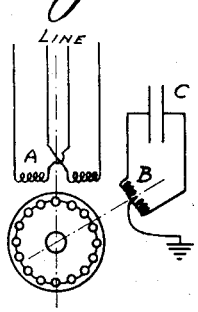

It has been found that, if the number of turns in the winding B is made from three to five times the number of turns in the winding A, the transformer T may be dispensed with and the condenser C connected directly in the circuit of the winding B, as indicated in Figures 3 to 6 inclusive. In Figure 3, the winding B is shown connected in series with the supply line and with the condenser C. In Figure 4, the winding A is shown as a double voltage winding; that is, having two sections which may be connected in series or parallel, so as to be suitable for operation on either of two voltages. In the case of Figure 4, the winding B is connected directly to the condenser C and has its middle point grounded, for the sake of safety.

It has also been found that, 1n a high ohmic resistance rotor winding is used, the rotor current will be more nearly in phase with the flux set up by the winding B and a greatly improved starting torque will be obtained, and the performance of the motor at full speed will also be greatly improved.

Figure 5:
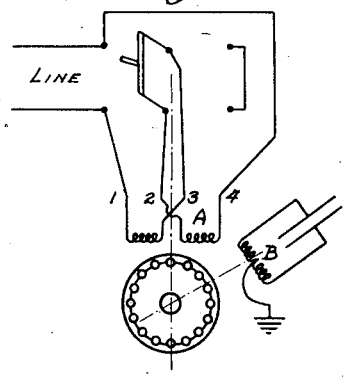
Figures 5 and 6 show two methods for variable speed control.
Figure 6:
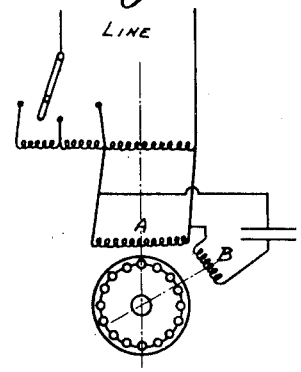

If the rotor ohmic resistance is made from three to five times the ohmic resistance of a normal squirrel cage winding, such as may be applied to a polyphase motor of general utility, the motor will have good performance both at starting and at full running speed. Such a motor will, in fact, show a good performance throughout its speed range from starting up to full speed, and may be used as a variable speed motor, the speed being controlled by varying the supply voltage. Such voltage variation may be obtained by means of regulating resistance, multiple voltage transformers, or other suitable means. With the arrangement of Figure 4, the motor may be used as a two-speed motor with, say, a fan load by simply arranging to connect the two halves of the winding A in series or parallel on the same supply voltage. Such an arrangement is illustrated in Figure 5. Figure 6 shows a variable speed connection in which the voltage variation is obtained by means of a transformer having a plurality of taps.

Figure 7:
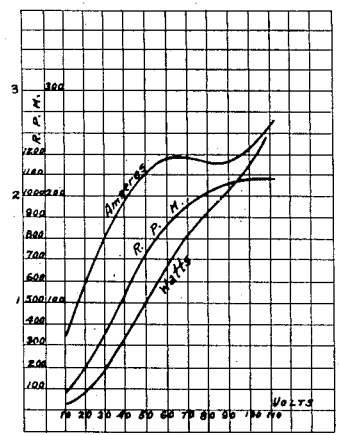
Figure 7 is a performance diagram of a motor embodying this invention.
Figure 8:
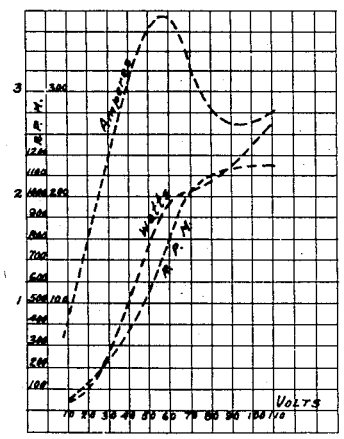
Figure 8 is a similar performance chart, the motor having a normal rotor.

It will be seen, therefore, that this invention provides a single phase motor of improved characteristics. The arrangement of the windings described is such as to provide a starting torque with relatively low starting current and at the same time a running performance, either as a variable speed motor or as a constant speed motor which exhibits desirable characteristics throughout its speed range. Such a motor shows a good efficiency and high power factor throughout its range of speed. Figure 7 shows the tested characteristic curves of a one-sixth (1/6) horse power 110 volt, 1200 R. P. M., 60 cycle motor built in accordance with this invention.

While certain theories of operation have been set forth, it will be understood that this is for the purpose of illustration and that applicant does not limit himself to any particular theory of operation.

It will further be understood that certain sub-combinations are of utility and may be employed without reference to other features, and that such is contemplated by and is within the scope of the appended claims. It is further obvious that various changes may be made in the details of construction, within the appended claims, without departing from the spirit of this invention. It is, therefore, to be understood that this invention is not limited to the specific details shown and described.

Having thus described the invention, what is claimed is:

1. An alternating current induction motor having a stator and a rotor, a main stator winding, an auxiliary stator winding angularly displaced from said main winding and so as to have an E. M. F. induced therein by the flux set up by said main winding, and a condenser connected to receive a current set up by the combination of said E. M. F. with the supply E. M. F.

2. An alternating current induction motor having a stator and a rotor, a main stator winding, an auxiliary stator winding angularly displaced from said main winding and so as to have an E. M. F. induced therein by the flux set up by said main winding, a condenser in the circuit of said auxiliary winding, and means for limiting the current in said circuit.

3. An alternating current induction motor having a stator and a rotor, a main stator winding, an auxiliary stator winding angularly displaced from said main winding and so as to have an E. M. F. induced therein by the flux set up by said main winding, a condenser in the circuit of said auxiliary winding, and means including a transformer having high leakage for limiting the current in said circuit.

4. An alternating current induction motor having a stator and a rotor, a main stator winding, an auxiliary stator winding angularly displaced from said main winding and so as to have an E. M. F. induced therein by the flux set up by said main winding, a condenser in the circuit of said auxiliary winding, and means acting in response to the E. M. F. induced in said auxilary winding for automatically adjusting the current in said circuit in accordance with the speed of the motor.

5. An alternating current induction motor having a stator and a rotor, a main stator winding, an auxiliary stator winding angularly displaced from said main winding and so as to have an E. M. F. induced therein by the flux set up by said main winding, a condenser in the circuit of said auxiliary winding, means for adjusting the current in said circuit in accordance with the speed of the motor, and a high-resistance winding on said rotor.

6. An alternating current induction motor having a stator and a rotor, a main stator winding, an auxiliary stator winding displaced substantially sixty electrical degrees from said main winding and having from three to five times the number of turns thereof, and a condenser connected to receive a current set up by said auxiliary winding.

7. An alternating current induction motor having a stator and a rotor, a main stator winding, an auxiliary stator winding displaced substantially sixty electrical degrees from said main winding and having from three to five times the number of turns thereof, a condenser connected to receive a current set up by said auxiliary winding, and a high-resistance winding on said rotor.

8. An alternating current induction motor having a stator and a rotor, a main stator winding, an auxiliary stator winding displaced substantially sixty electrical degrees from said main winding and having from three to five times the number of turns thereof, a condenser connected to receive a current set up by said auxiliary winding, and a rotor winding having from three to five times the resistance of a normal squirrel-cage rotor.

9. An alternating current induction motor having a stator and a rotor, a main stator winding, an auxiliary stator winding angularly displaced from said main winding and so as to have an E. M. F. induced therein by the flux set up by said main winding, a condenser connected to receive a current set up by the combination of said E. M. F. with the supply E. M. F., and a high-resistance winding on said rotor.

In testimony whereof I affix my signature this 12th day of August, 1927.

EDWIN C. BALLMAN.